United States Patent [19]

Takamiya et al.

[11] Patent Number: 5,072,238

[45] Date of Patent: Dec. 10, 1991

[54] HEAT TRANSFER RECORDING METHOD

[75] Inventors: Makoto Takamiya, Kawasaki; Kosuke Yamamoto, Yokohama; Haruhiko Takahashi, Yokohama; Yasuyuki Tamura, Yokohama; Nobuyuki Kuwabara, Tokyo; Tadashi Yamamoto; Hitoshi Kishino, both of Kawasaki, all of Japan

[73] Assignee: Canon Kabushiki Kaisha, Tokyo, Japan

[21] Appl. No.: 632,641

[22] Filed: Dec. 26, 1990

Related U.S. Application Data

[63] Continuation of Ser. No. 330,266, Mar. 29, 1989, abandoned.

[30] Foreign Application Priority Data

Mar. 30, 1988 [JP] Japan ................................ 63-074564
Apr. 28, 1988 [JP] Japan ................................ 63-104320

[51] Int. Cl.[5] ............................................ G01D 15/16
[52] U.S. Cl. ................................ 346/76 PH; 400/120
[58] Field of Search ............... 346/1.1, 76 PH, 139 C, 346/139 R, 140 R; 400/120

[56] References Cited

U.S. PATENT DOCUMENTS 4,617,577 10/1986 Takahashi et al. ............ 346/139 R
4,641,151 2/1987 Kato et al. ..................... 346/76 PH
4,750,007 6/1988 Suzuki ........................... 346/76 PH

*Primary Examiner*—Mark J. Reinhart
*Attorney, Agent, or Firm*—Fitzpatrick, Cella, Harper & Scinto

[57] ABSTRACT

The present invention provides a heat transfer recording apparatus for recording an image on a recording medium by selectively applying thermal energy by a recording head, comprises: conveying means for conveying a transfer medium, a recording head for selectively applying the energy to the transfer medium, pressing means for changing a pressing force of the recording head, tension means for changing a conveying tension on the transfer medium, peeling angle changing means for changing an angle of the transfer medium peeled from the recording medium; and control means for changing the conveying tension on the transfer medium or/and the peeling angle in response to the change in the pressing force of the recording head. The present invention further provides a heat transfer recording method for recording an image on a recording medium by selectively applying thermal energy by a recording head, wherein: when a pressing force of the recording head is increased, a tension on a transfer medium at a downstream side of the transfer medium with respect to the recording head is increased, or a tension on the transfer medium at an upstream side of the transfer medium with respect to the recording head is decreased, or a peeling angle of the transfer medium peeled from the recording medium is increased.

5 Claims, 14 Drawing Sheets

HEAT TRANSFER RECORDING METHOD

This application is a continuation of application Ser. No. 07/330,266 filed Mar. 29, 1989 now abandoned.

BACKGROUND OF THE INVENTION

1. Field of the Invention

The present invention relates to a heat transfer recording method for recording images on a recording medium and, and a heat transfer recording apparatus using such method. More particularly, it relates to a heat transfer recording method for recording images on a recording medium by transferring ink from a transfer medium including the ink to the recording medium, and a heat transfer recording apparatus for carrying out such method.

The heat transfer recording apparatus can include electronic typewriters, word processors, printers, copying machines, facsimiles and the like.

2. Related Background Art

Up to date, various recording apparatuses have been developed as output means for outputting the inputted information. Among them, a typical one is a heat transfer recording apparatus.

In the heat transfer recording apparatus, an image is recorded on a recording paper by pressing an ink sheet against the recording paper by a recording head, then by selectively heating the recording head to fuse heat fusible ink coated on the ink sheet in accordance with an image pattern, thus transferring the fused ink onto the recording paper. Accordingly, the heat transfer recording apparatus has advantages that it is light-weighted, compact and noiseless, and, therefore, has been widely used as the output means of word processors, electronic typewriters and the like.

In the heat transfer recording apparatus, while it is preferable to use the recording paper having smooth surfaces such as a plain paper, it has recently been requested to record the image even on a rough (smoothless) recording paper such as a bond paper, as well as the smooth-faced plain paper, with high dignity.

In order to record the image on the rough recording paper with high dignity, it is desirable to increase the pressing force of the recording head acting on the recording paper. However, if the pressing force of the recording head is increased, when the smooth-faced plain paper is used as the recording paper, it will be difficult to correct the image erroneously recorded on the plain paper; thus, it is necessary to make the pressing force variable. In this case, however, when the pressing force of the recording head is increased in case of the rough recording paper, the moving ink sheet will slip on the recording paper and/or there will be a delay in separation of the ink sheet from the recording paper, thus worsening the dignity of the recorded image.

In this way, in the conventional heat transfer recording method, there will be a difference in dignity of the recorded image in accordance with the degree of smoothness of the used recording papers. In particular, when the smoothless recording paper such as a rough paper is used, the edge of the image transferred to and recorded on such smoothless paper will be indistinct or blurred, and, further, if the ink is heat transferable ink including wax as a main component, the image recorded on the smoothless paper will be light in color.

It has been tried to increase the density of the transferred image by using the heat transferable ink including, as a main component, resin having relatively high viscosity when fused. However, in this case, since the ink is extensible, the edge of the transferred image will be indistinct (i.e., the sharpness of the edge of the recorded image will be insufficient), thereby worsening the dignity of the image.

SUMMARY OF THE INVENTION

An object of the present invention is to provide a heat transfer recording method and a heat transfer recording apparatus using such method, which can obtain recorded images of high dignity.

Another object of the present invention is to provide a heat transfer recording method and a heat transfer recording apparatus using such method, which can effectively record images even on a smoothless recording paper.

A further object of the present invention is to provide a heat transfer recording method and a heat transfer recording apparatus using such method, which can prevent a moving transfer medium from slipping on a recording medium and eliminate a delay in separation of the transfer medium from the recording medium.

A still further object of the present invention is to provide a heat transfer recording method and apparatus which can eliminate the above-mentioned drawbacks of the conventional methods and apparatuses, and can obtain a transferred image of high dignity, regardless of the degree of smoothness of a recording medium.

A further object of the present invention is to provide a heat transfer recording method and a heat transfer recording apparatus using such method, which can eliminate the above-mentioned drawbacks of the conventional methods and apparatuses, and can record images with high dignity, by setting a peeling or separating angle of a transfer medium from a recording medium and a front tension (conveying tension) of the transfer medium at optimum values.

A further object of the present invention is to provide a heat transfer recording method and a heat transfer recording apparatus using such method, which can record images with high dignity regardless of the degree of smoothness of a surface of a recording medium, by altering the conveying tension of the transfer medium and the peeling angle of the transfer with respect to a pressing force of a recording head.

A further object of the present invention is to provide a heat transfer recording method and a heat transfer recording apparatus using such method, which can make the edge of a recorded image distinct or sharp.

The other object of the present invention is to provide a heat transfer recording method and a heat transfer recording apparatus using such method, which can separate non-heated ink from heated ink moderately to keep the degree of extension of the heated ink constant, by selecting the peeling angle of the transfer medium to 40° or less, thereby making the edge of a recorded image distinct or sharp.

DETAILED DESCRIPTION OF THE PREFERRED EMBODIMENTS

The present invention will now be explained in connection with embodiments applied to a serial-type heat transfer recording apparatus with reference to the accompanying drawings.

Figure 1:
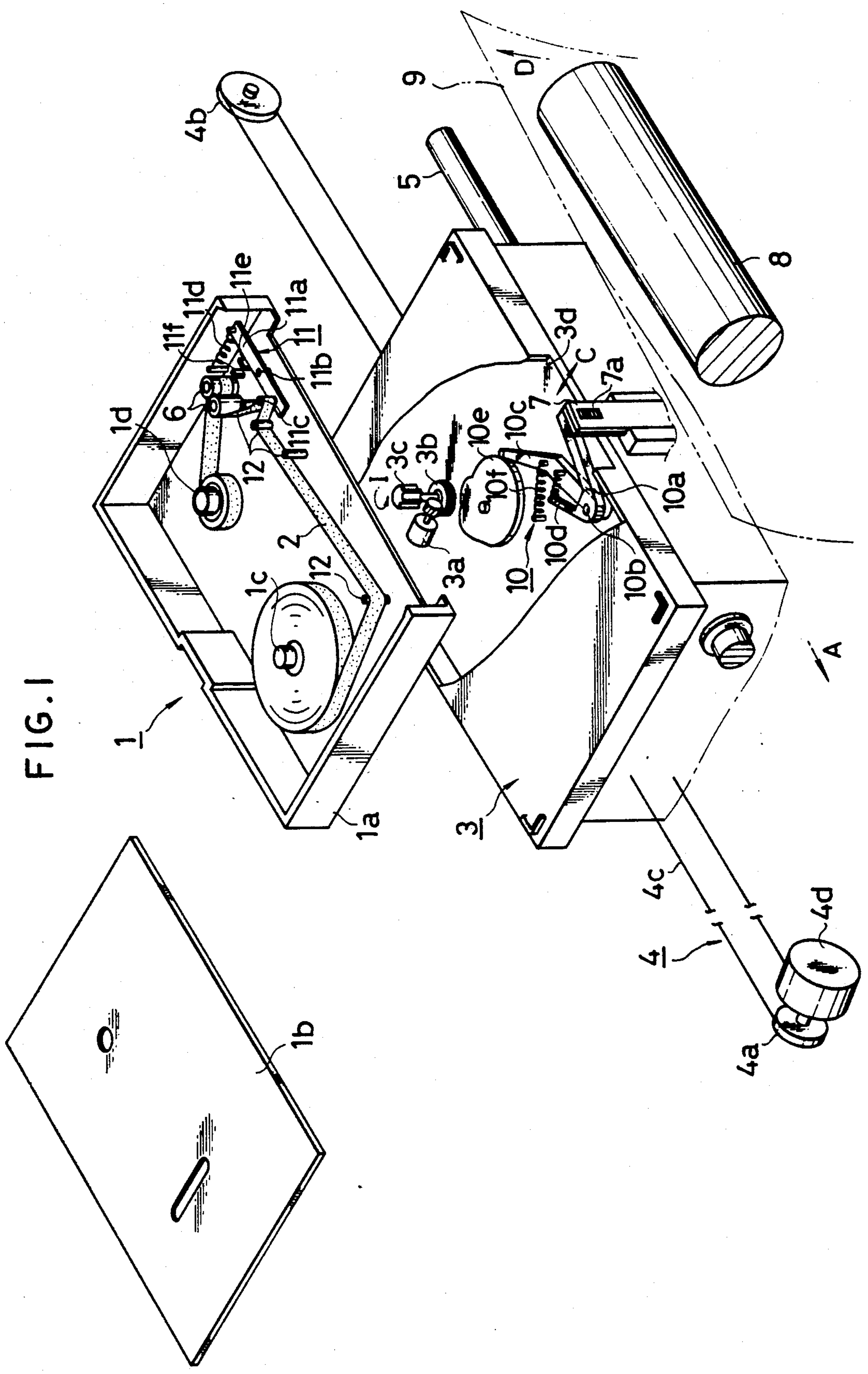
FIG. 1 is an exploded perspective view of a heat transfer recording apparatus according to a preferred embodiment of the present invention.
Figure 2:
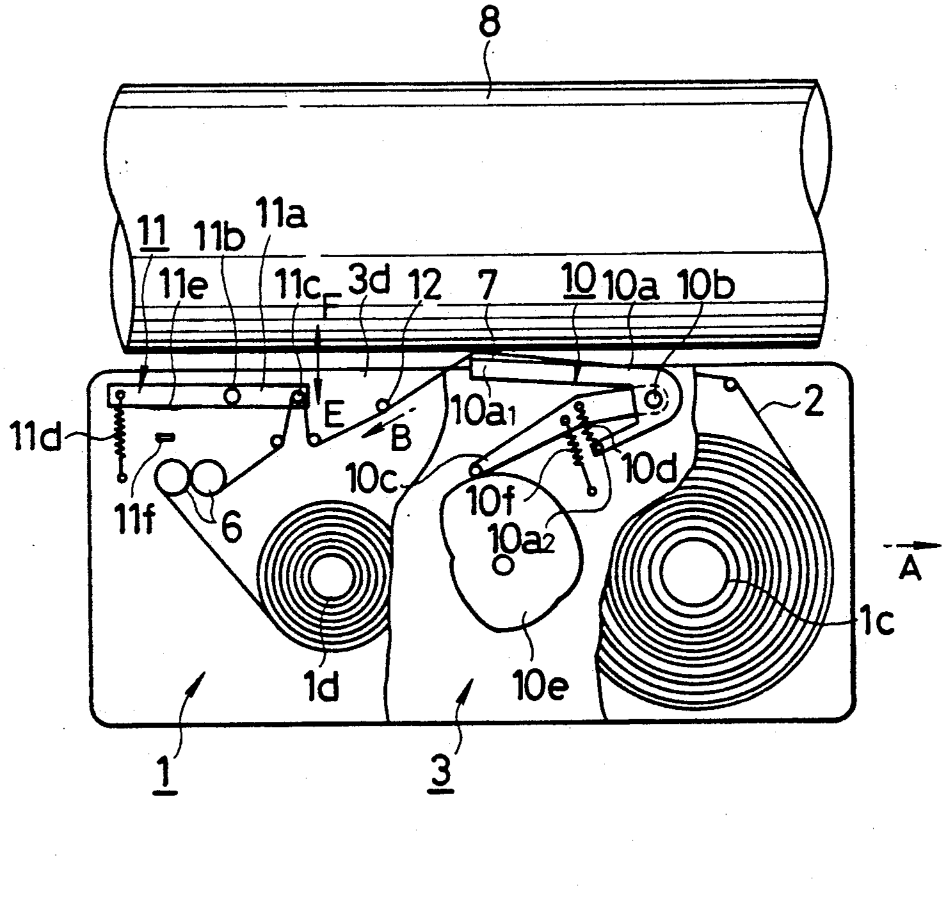
FIG. 2 is a view, partially broken, of a main portion of the apparatus of FIG. 1.

FIG. 1 shows an exploded perspective view of a heat transfer recording apparatus embodying the present invention, and FIG. 2 shows a main portion of the apparatus in partially broken.

First of all, the whole construction of the apparatus will be briefly explained. As shown, an ink ribbon 2 constituting a transfer medium is housed in a cassette 1 which can be removably mounted on a carriage 3. The carriage 3 is reciprocably shifted along a carriage shaft 5 by means of a driving mechanism 4. When the carriage 3 is shifted in a direction shown by an arrow A, the ink ribbon 2 is fed out by means of a pair of rollers 6 which constitute ink ribbon conveying means. At the same time, a portion of the ink ribbon 2 is pressed against a recording medium (for example, a plain paper, a plastic sheet and the like) (referred to as "recording paper" hereinafter) 9 by means of a recording head and is heated by the recording head, thus transferring ink on the ink ribbon onto the recording paper 9 to record an image thereon. Incidentally, the recording paper 9 is supported, at its back surface, by a platen roller 8.

The pressing force that the recording head 7 presses the ink ribbon 2 and the recording paper 9 against the platen roller 8 during the recording operation can be changed by pressing means 10. Further, a tension force acting on the ink ribbon 2 being pressed can also be changed by tensioning means 11.

Next, the construction of each of the constructural elements will be fully explained. First of all, the cassette 1 is constituted by an upper cover 1*b* and a lower case 1*a* within which the ink ribbon 2 constituting the transfer medium is received. The ink ribbon 2 comprises a base film and a heat transferable (for example, heat fusible, thermoplastic, or heat sublimable) ink layer. The ink ribbon 2 is wound around a feeding core 1*c* in the cassette 1 and extends from the feeding core 1*c* to pass through an aperture (not shown) formed in the lower case 1*a* so as to be exposed, and then is wound around a take-up core 1*d*.

The carriage 3 is connected to a belt 4C extending between pulleys 4*a* and 4*b*, so that, when a carriage motor 4*d* connected to the pulley 4*a* is energized, the carriage 3 is reciprocably shifted along the carriage shaft 5.

When the carriage 3 is shifted in the direction A, the ink ribbon 2 is gradually fed out from the feeding core 1*c*, by shifting the ink ribbon by means of the pair of conveying rollers 6 in a direction shown by an arrow B, and by shifting the recording head 7 while pressing the ink ribbon 2 against the recording paper 9.

Further, within the carriage 3, a winding motor 3*a*, and a take-up shaft 3*c* connected to the winding motor through a friction clutch 3*b* are arranged in place in such a manner that, only when the recording is effected, i.e., only when the carriage 3 is shifted in the direction A, the take-up shaft 3*c* is rotated in a direction shown by an arrow I in synchronous with the movement of the carriage 3. The friction clutch 3*b* is so selected that, when a torque of a predetermined value or more is applied to the clutch, it does not transmit a rotational force of the motor 3*a* to the take-up shaft 3*c*. When the cassette 1 is mounted on the carriage 3, the take-up core 1*d* is fitted onto the take-up shaft 3*c*, whereby the ink ribbon 2 is wound around the take-up core 1*d* by the same amount as that fed out from the feeding core 1*c*, by driving the motor 3*a*.

Further, the carriage 3 is provided at its front surface with an aperture 3*d* in a position corresponding to the aforementioned aperture of the lower case 1*a* of the cassette 1, and the recording head 7 is positioned in front of the aperture 3*d* for rocking movement in the directions shown by an arrow C.

The recording head 7 is constituted as a thermal head having a plurality of heating elements 7*a* arranged in a row and selectively energized in response to an image signal. When the recording operation is effected, the recording head 7 is lowered and at the same time is pressed, with the interposition of the ink ribbon, against the recording paper 9 supported by the platen roller 8, at a predetermined pressing force by means of the pressing means 10.

Next, the construction of the pressing means 10 will be fully explained. As shown in FIGS. 1 and 2, a bent arm 10*a* is rotatably supported by a shaft 10*b* at its bent portion. The bent arm 10*a* has one end $10a_1$ supporting the recording head 7 thereon, and the other end $10a_2$ connected to one end of a tension spring 19*d*, the other end of which is connected to a pressure variable arm 10*c*.

The pressure variable arm 10*c* has one end rotatably mounted on the shaft 10*b*, and the other end abutted against an outer periphery of an eccentric cam 10*e* by means of a tension spring 10*f*.

Accordingly, when the cam 10*e* is rotated, the spring 10*d* is pulled, thus changing the pressing force of the recording head 7 against the ink ribbon 2 in response to the pulling force of the spring. In the illustrated embodiment, it is so constructed that the pressing force of the recording head can be changed at plural stages by rotating the eccentric cam 10*e* steppingly.

Further, the ink ribbon 2 is so tensioned that the tension on the ink ribbon at the downstream side from the recording head 7, i.e., at the take-up side with respect to the recording head (referred to as "front tension" hereinafter) can be changed by the tensioning means 11. The tensioning means 11 comprises a tension arm 11*a* rotatably supported by a shaft 11*b* and having one end provided with a ribbon guide roller 11*c* rotatably supported thereon and the other end connected to a tension spring 11*d*. The ink ribbon 2 is guided by a guide roller 12 rotatably mounted on the lower case 1a and the guide roller 11c on the tension arm 11a, and passes through between the paired rollers 6 and then reaches the take-up core 1d.

Accordingly, the ink ribbon 2 is pulled in an upward direction (FIG. 2) by the force of the tension spring 11d, thereby applying the tension to the ink ribbon.

Further, a magnet 11e is fixed to the tension arm 11a, which magnet 11e cooperates with a hall element 11f fixed to the lower case 1a in confronting relation to the magnet. With this arrangement, a distance between the magnet 11e and the hall element 11f, and, accordingly the inclination of the tension arm 11a can be detected.

Next, an operation for changing or altering the front tension in the above mechanism will be explained. For example, when it is desired to increase the front tension, the rotational speed of the paired rollers 6 is increased temporarily, whereby the amount of ribbon conveyed by the pair of rollers 6 is greater than the amount of ribbon fed from the feeding core 1c caused by the movement of the carriage 3 and the like. As a result, the tension arm 11a is rotated in a clockwise direction shown by an arrow E (FIG. 2) to increase the tension force of the spring 11d, thereby increasing the tension acting on the ink ribbon 2. On the other hand, when it is desired to decrease the front tension, conversely to the above, the rotational speed of the paired rollers 6 is decreased temporarily. As a result, the tension arm 11a is rotated in an anti-clockwise direction shown by an arrow F (FIG. 2), thereby decreasing the tension acting on the ink ribbon 2.

Further, by detecting the inclination of the tension arm 11a by means of the hall element 11f and by controlling the rotational speed of the paired rollers 6 on the basis of the detected result to maintain or hold the tension arm 11a in a position corresponding to a predetermined set tension value, it is possible to maintain the front tension acting on the ink ribbon 2 to the set tension value.

Figure 3:
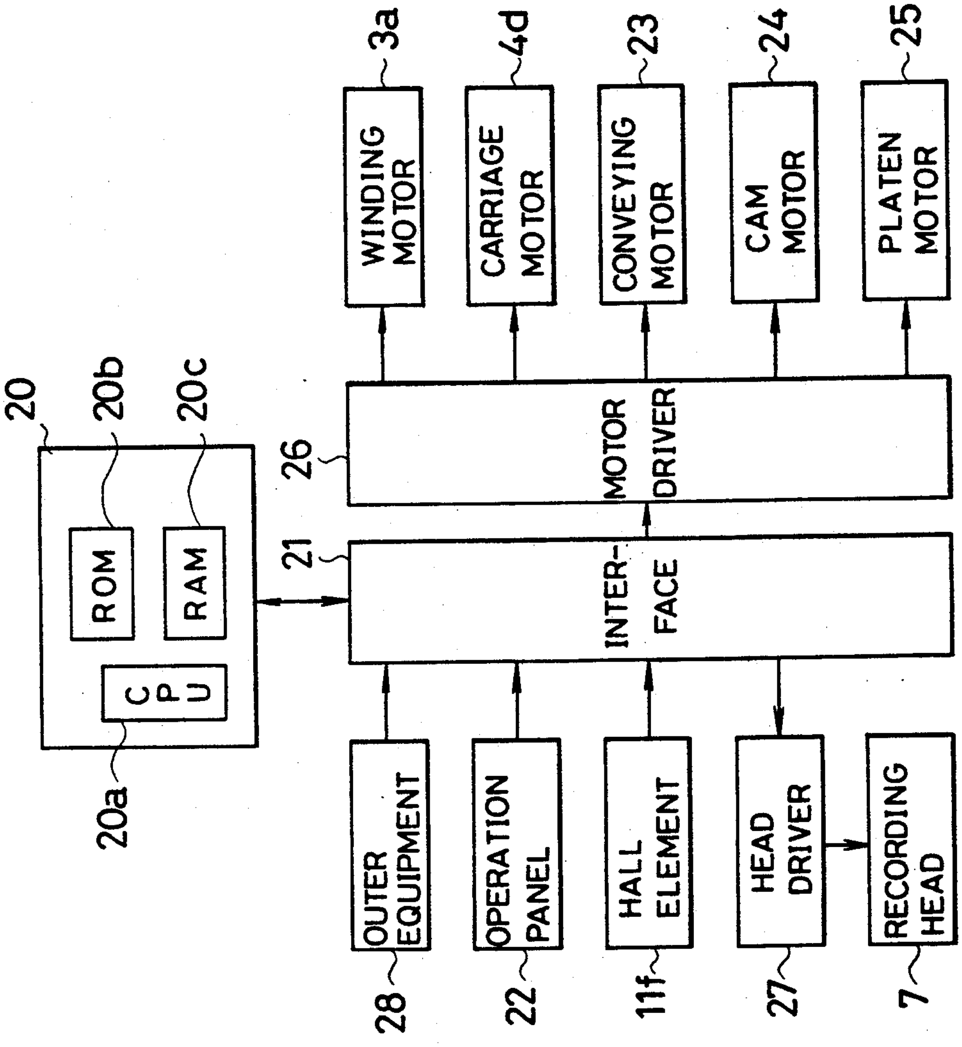
FIG. 3 is a block diagram of a control system.

Next, a control system for controlling the above-mentioned mechanisms will be explained. As shown in FIG. 3, the control system comprises a control unit 20 including a CPU 20a such as a microprocessor, a ROM 20b storing a control program for the CPU 20a and other various data, and a RAM 20c for storing various data temporarily and being used as a work area for the CPU 20a, an interface 21, an operation panel 22, a motor driver 26 for driving various motors (winding motor 3a, carriage motor 4d, conveying motor 23 for driving the paired rollers 6, cam motor 24 for driving the eccentric cam 10e, platen motor 25 for driving the platen roller 8), a head driver 27 for driving the recording head, and the hall element 11f.

The control unit 20 receives various informations (for example, density of image, pressing force of the recording head, the number of papers to be recorded, size of paper to be recorded) from the operation panel 22 through the interface 21, and also receives an image signal from an external or outer equipment 28. Further, the control unit 20 outputs various motor ON, OFF signals for driving the respective motors and the image signal through the interface 21, thereby driving various elements by these signals. And, the control unit further controls to change the front tension of the ink ribbon 2 in correspondence to the pressing force of the recording head 7.

In the illustrated embodiment, the pressing force of the recording head 7 can be changed at plural stages as mentioned below, and the control unit 20 has a following setting table for setting the front tension according to the various pressing force as mentioned below:

| Head Pressure (gf) | Front Tension (gf) |
|---|---|
| 400 | 80 |
| 600 | 100 |
| 800 | 120 |
| 1000 | 140 |
| 1200 | 160 |
| 1400 | 180 |

Incidentally, in case of the above-mentioned set tension value, a tension of the ink ribbon at an upstream side with respect to the recording head 7 (referred to as "back tension" hereinafter) is selected to have a constant value of 40 gf.

Figure 4A:
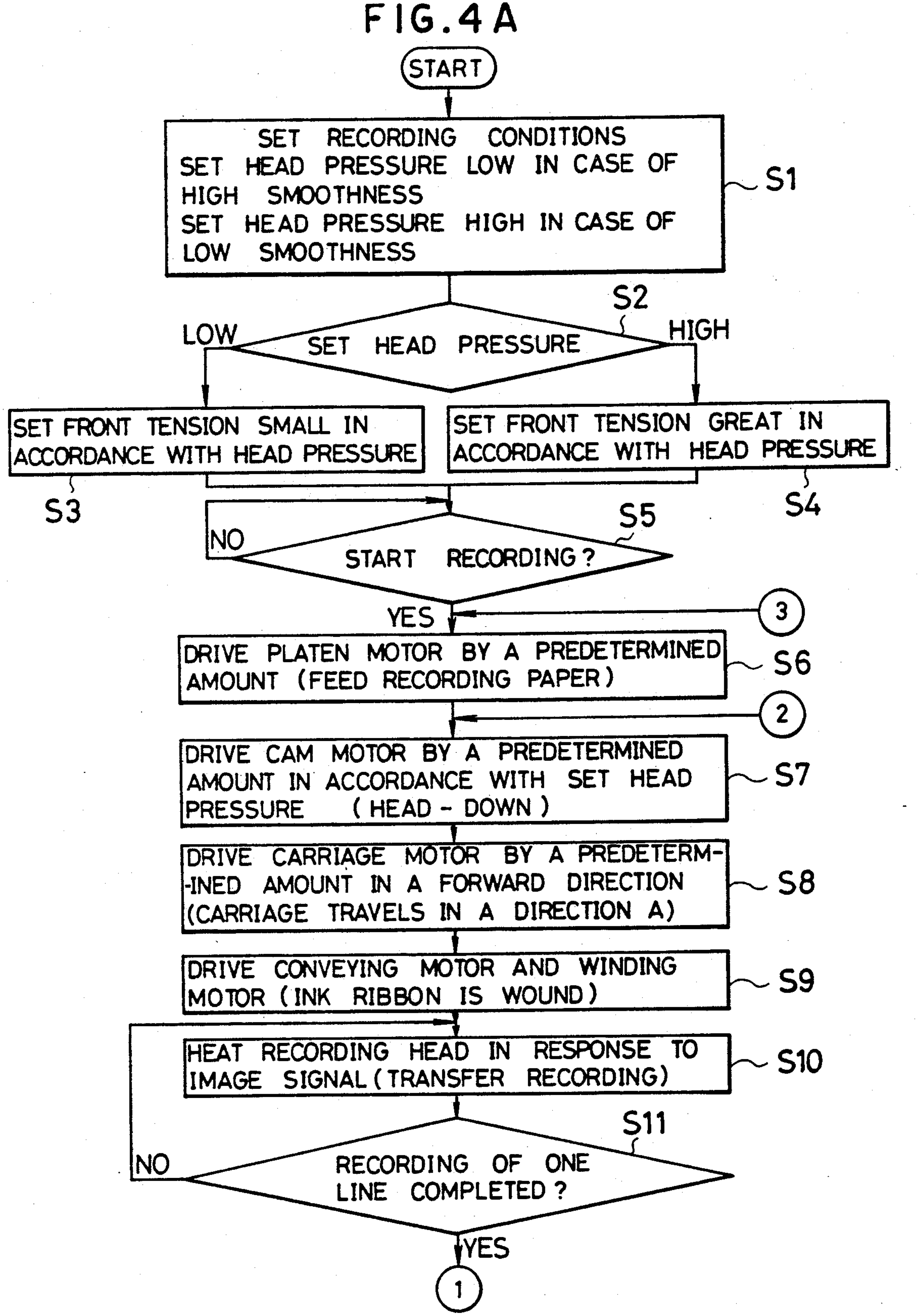
FIGS. 4A and 4B are flow charts for executing a recording operation.
Figure 4B:
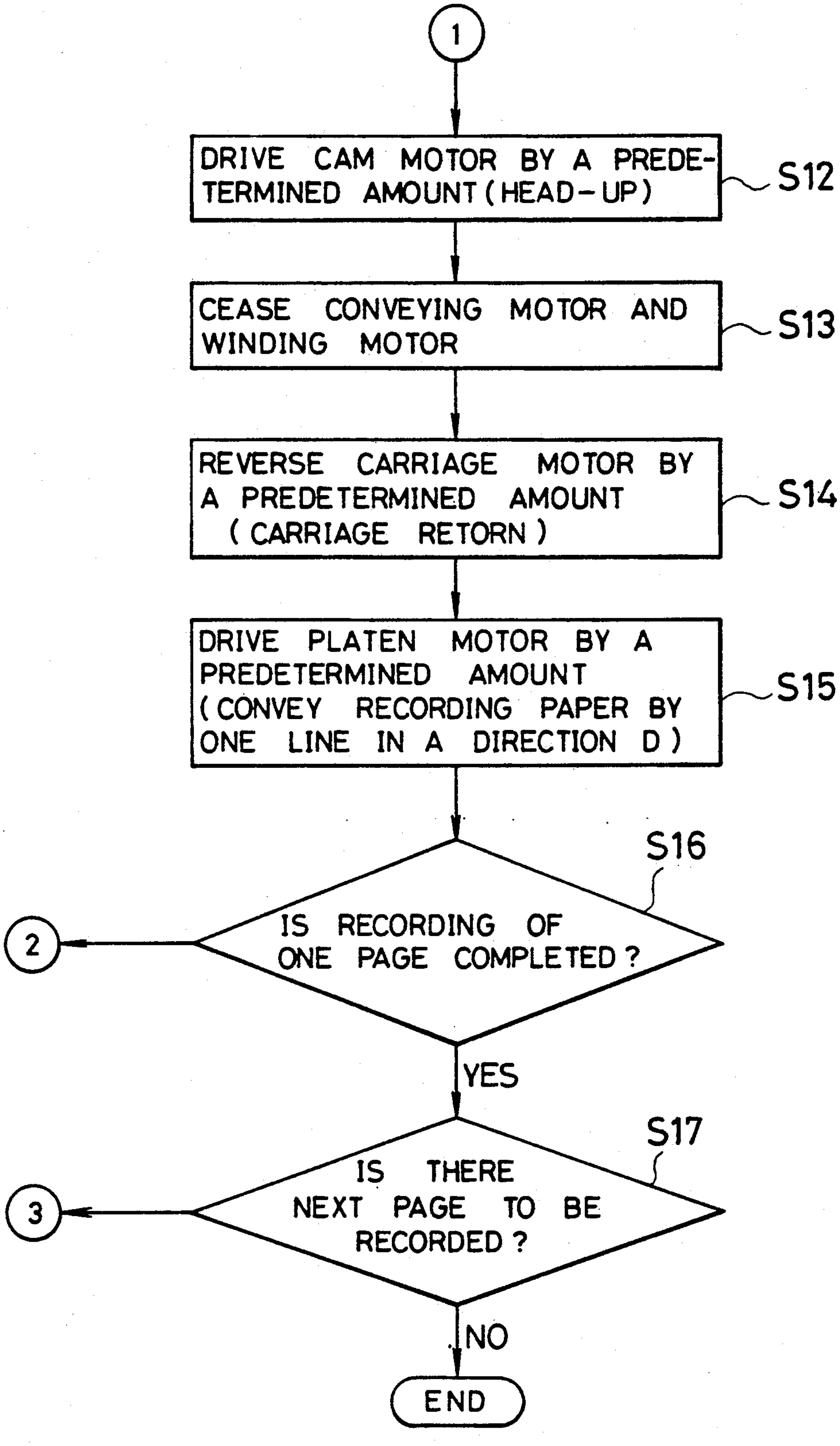

Next, a heat transfer recording method using the above-mentioned heat transfer recording apparatus will be explained with reference to a flow chart shown in FIG. 4.

First of all, in order to set recording conditions such as the density of image, the pressing force of the recording head 7 (head pressure) is set in accordance with the degree of smoothness of the recording paper 9 by the operation panel 22. The pressing force of the recording head is so set that the head pressure will be high in case of low smoothness of the recording paper and will be low in case of high smoothness of the recording paper (step S1).

Next, in steps S2 to S4, in accordance with the set head pressure, the conveying motor 23 is driven by the signal from the control unit 20, thus controlling the front tension of the ink ribbon 2. More particularly, when the head pressure is set to the low value, the front tension is controlled to be small (S3), whereas, when the head pressure is set to the high value, the front tension is controlled to be great (S4).

Next, going to a step S5, where a recording start signal is inputted by a recording start switch on the operation panel 22 and the like. As a result, the sequence goes to steps S6, S7, and so on to perform the recording operation.

More particularly, in the step S6, the platen motor 25 is driven to rotate the platen roller 8, thus feeding the recording paper 9. In the next step S7, the cam motor 24 is driven to rotate the eccentric cam 10e to effect a head-down so that the recording head 7 presses against the ink ribbon 2 with the set head pressure. Then, in steps S8 to S10, the carriage motor 4d is driven to shift the carriage 3 in the direction A (FIG. 2), and the conveying motor 23 and the winding motor 3a are also driven to wind up the ink ribbon 2 fed from the feeding core 1c onto the take-up core 1d. In synchronous with this, the recording head 7 is selectively heated in response to the image signal to heat the ink on the ribbon 2 selectively and to transfer the heated ink onto the recording paper 9, thus recording the image on the latter. In this case, in order to maintain the front tension of the ink ribbon to a tension value corresponding to the set head pressure, the rotational speed of the paired rollers 6 is controlled by the signal from the hall element 11f, thereby maintaining the tension arm 11a to a predetermined position.

Next, going to a step S11, where it is judged whether the recording of one line is completed or not. If completed, the sequence goes to steps S12 to S15, where the cam motor 24 is driven to effect a head-up of the recording head 7 (S12), and at the same time, the conveying motor 23 and the winding motor 3$a$ are stopped (S13). And, the carriage motor 4$d$ is reversedly driven to return the carriage 3 to a home position (S14), and further, the platen motor 25 is driven to convey the recording paper 9 by one line in a direction shown by an arrow D in FIG. 1 (S15).

Next, going to a step S16, where the step judges whether the recording of one page is completed or not. If no, the sequence returns to the step S7, thus performing the recording of the next line and so on in the same manner as the processes mentioned above. On the other hand, if yes, the sequence goes to a step S17, where it is judged whether there is a next page to be recorded or not. If yes, the sequence returns to the step S6, thus repeating the recording operation similar to that mentioned above, whereas, if no, the recording operation is completed.

As mentioned above, if the smoothness of the surface of the recording paper 9 is low, the transferability of the ink to the recording paper is increased by setting the head pressure to the high value, and at the same time, the ink ribbon 2 is prevented from slipping with respect to the recording paper 9 by increasing the front tension of the ink ribbon 2. In this way, it is possible to record the image with high quality even on the smoothless recording paper.

Incidentally, in the smoothless recording paper, even if the recording is effected with the high head pressure, the erroneously recorded image can be easily corrected.

When the recording paper 9 having the high surface smoothness is used, the correction of the erroneous image will often be difficult if the image is recorded on such paper with high head pressure. However, as in the illustrated embodiment, by performing the recording for such smooth-faced recording paper with low head pressure, the erroneous image can be easily corrected, and the image having high quality can be obtained.

Next, an embodiment wherein a peeling angle of the ink ribbon 2 with respect to the recording paper 9 is changed in accordance with the change in the head pressure of the recording head 7 will be explained. Incidentally, in this embodiment, the same elements as those in the previous embodiment will be designated by the same reference numerals, and the explanation therefor may be referred to the previous embodiment.

Figure 5:
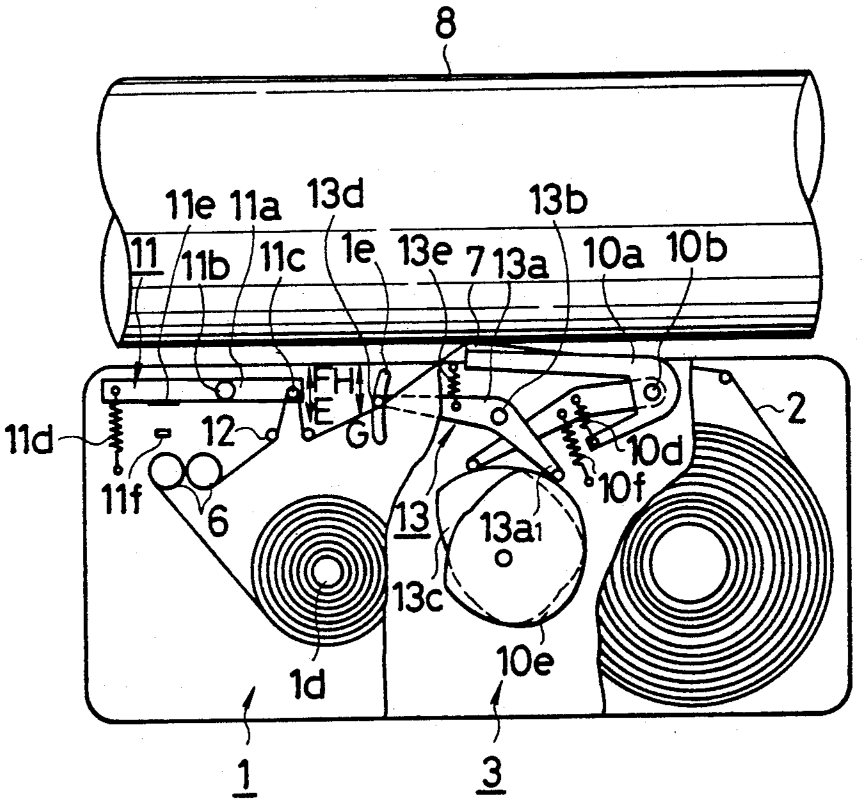
FIG. 5 is a view, partially broken of a main portion of a heat transfer recording apparatus according to another embodiment of the present invention.

In FIG. 5, a peeling angle changing means 13 for changing or altering the peeling angle $\theta$ of the ink ribbon 2 is provided within the carriage 3. The peeling angle changing means 13 comprises a peeling angle changing bent arm 13$a$ rotatably mounted on a shaft 13$b$ at its bent portion and having one end 13$a_1$ abutted against an eccentric cam 13$c$. Therefore, when a cam motor (not shown) connected to the cam 13$c$ is driven to rotate the eccentric cam 13$c$, the bent arm 13$a$ is also rotated to follow the outer periphery of the cam.

Further, a guide roller 13$d$ is rotatably supported on the other end of the bent arm 13$a$, which guide roller protrudes into the cassette 1 through a curved elongated slot 1$e$ formed in the lower case 1$a$ of the cassette 1, so that the guide roller 13$d$ guides the ink ribbon 2 after passed the recording head 7.

Accordingly, if the bent arm 13$a$ is rotated in an anti-clockwise direction shown by an arrow G in FIG. 5, the peeling angle $\theta$ of the ink ribbon 2 with respect to the recording paper 9 will be great or increased, whereas, if the bent arm is rotated in a clockwise direction H, the peeling angle $\theta$ will be small or decreased.

Incidentally, the end 13$a_1$ of the peeling angle changing bent arm 13$a$ is always biased toward the eccentric cam 13$c$ to abut thereagainst, by means of a tension spring 13$e$ extending between the bent arm 13$a$ and a fixed point of the carriage 3.

Similar to the previous embodiment, the head pressure of the recording head 7 can be changed at plural stages through the operation panel. In this case, the control unit controls the rotation of the above-mentioned cam motor to change the peeling angle $\theta$ in accordance with the head pressure.

More particularly, if the head pressure is set to the high value, the bent arm 13$a$ is controlled to be rotated in the direction H, thus decreasing the peeling angle $\theta$. Whereas, if the head pressure is set to the low value, the bent arm 13$a$ is controlled to be rotated in the direction G, thus increasing the peeling angle $\theta$.

In this embodiment, the control unit includes a setting table for setting the front tension and the peeling angle in accordance with the head pressure as shown below:

| Head Pressure (gf) | Front Tension (gf) | Peeling Angle $\theta°$ |
|---|---|---|
| 400 | 80 | 45 |
| 600 | 100 | 42 |
| 800 | 120 | 38 |
| 1000 | 140 | 36 |
| 1200 | 160 | 34 |
| 1400 | 180 | 33 |

(Back Tension = 40 gf = Constant)

Accordingly, in the recording operation, when the recording paper 9 having the low surface smoothness is used, if the head pressure is set to the high value, the front tension of the ink ribbon 2 will be increased, and the peeling angle $\theta$ will be decreased. As mentioned above, when the head pressure is set to the low value and the peeling angle $\theta$ is set to be small, it is possible to obtain the recorded image having high quality even for the recording paper 9 having the low surface smoothness.

When the peeling angle $\theta$ is set to be small, it is desirable to set such peeling angle in a range that there is no delay in separation of the ink ribbon 2 from the recording paper 9.

Further, regarding the recording paper 9 having the high surface smoothness, if the head pressure is set to the low value, the front tension of the ink ribbon 2 will be decreased and the peeling angle $\theta$ will be increased. With respect to the recording paper 9 having the high surface smoothness, even if the head pressure is set to the low value, the quality of the recorded image is not worsened, but, on the contrary, the transferred image can be easily corrected. Further, by increasing the peeling angle $\theta$, the delay in separation of the ink ribbon 2 from the recording paper 9 can be effectively eliminated, thus preventing the reduction of the image quality.

In the illustrated embodiment, while the tension of the ink ribbon 2 was controlled by controlling the front tension thereof, the tension of the ink ribbon may be controlled by controlling the back tension thereof.

That is to say, regarding the tension of the ink ribbon 2 in accordance with the head pressure, if the back tension is greater than the front tension when the head pressure is increased, the ink ribbon 2 will not be slipped on the recording paper. Accordingly, instead of the fact that the front tension is changed as in the case of the previous embodiment, by so controlling that the back tension is decreased when the head pressure is set to the high value and by so controlling that the back tension is increased when the head pressure is set to the low value, the same effect can be obtained.

Incidentally, in order to change the back tension, the tensioning means 11 and the pair of rollers 6 shown in the first or previous embodiment may be arranged at the upstream side of the ink ribbon 2 with respect to the recording head 7.

Further, in this second embodiment, while both of the front tension and the peeling angle were changed in accordance with the change in the head pressure, only the peeling angle, or only the front tension or the back tension may be changed in accordance with the change in the head pressure.

As mentioned above, according to this second embodiment, since the head pressure that the recording head presses against the transfer medium (ink ribbon) can be changed and at the same time, at least either of the conveying tension or the peeling angle of the transfer medium can also be changed in accordance with the change in the head pressure, it is possible to obtain the recorded image having high quality and easy correction, regardless of the degree of the surface smoothness of the recording paper.

Next, a further embodiment will be explained.

Figure 6:
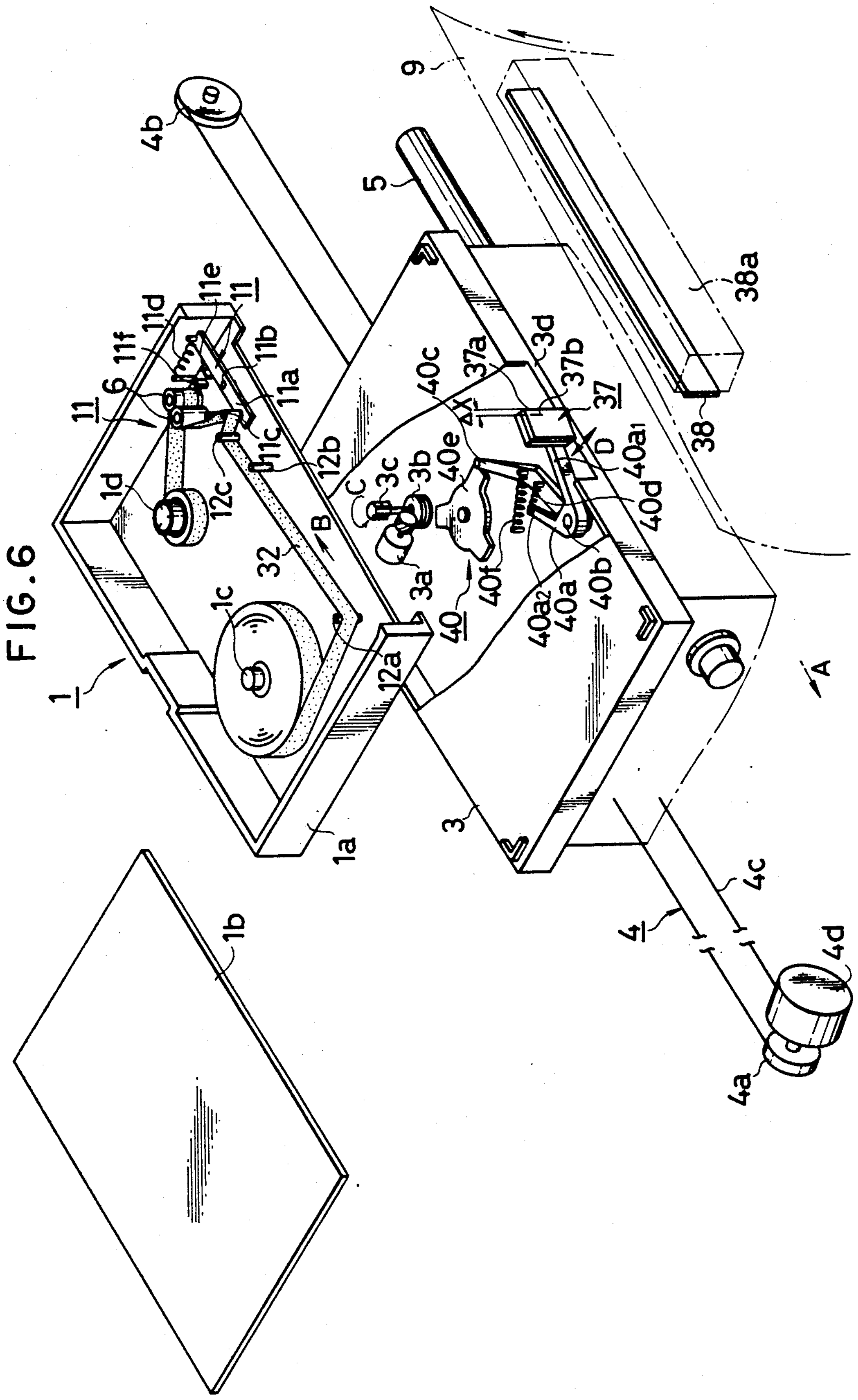
FIG. 6 is an exploded perspective view of a heat transfer recording apparatus according to a further embodiment of the present invention.
Figure 7:
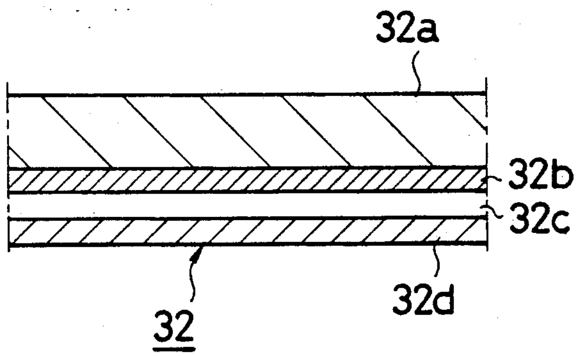
FIG. 7 is a sectional view of an ink ribbon showing the construction thereof.
Figure 8A:
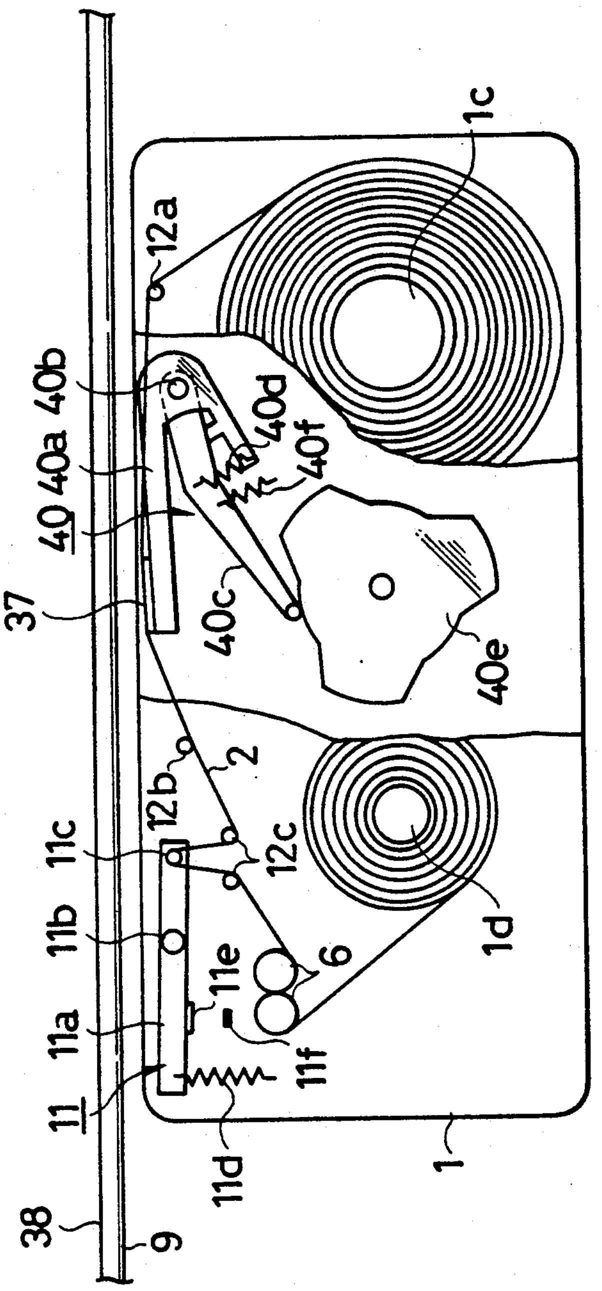
FIGS. 8A and 8B are view, partially broken, of recording portions of the apparatus.
Figure 8B:
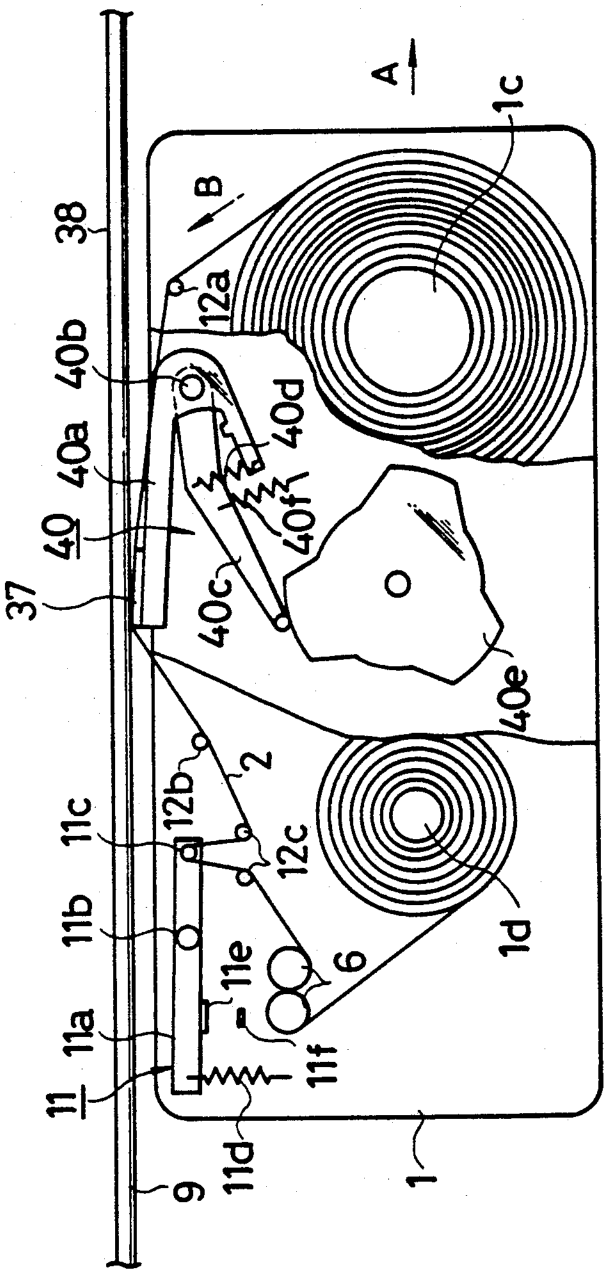

FIG. 6 shows an exploded perspective view of a heat transfer recording apparatus for carrying out a heat transfer recording method according to this embodiment, FIG. 7 shows a cross-section of the transfer medium (ink ribbon), FIG. 8A shows a recording portion in an inoperative position and FIG. 8B shows the recording portion in an operative position.

First of all, the whole construction of the apparatus will be briefly explained, for example, with reference to FIG. 6. An ink ribbon 32 constituting a transfer medium is housed in a cassette 1 which can be removably mounted on a carriage 3. The carriage 3 is reciprocably shifted along a carriage shaft 5 by means of a driving mechanism 4. When the carriage 3 is shifted in a direction shown by an arrow A, the ink ribbon 32 is fed out by means of a pair of rollers 6 which constitute ink ribbon conveying means. At the same time, a portion of the ink ribbon 32 is pressed against a recording medium (for example, a plain paper, a plastic sheet and the like) (referred to as "recording paper" hereinafter) 9 by means of a recording head 7 and is heated by the recording head, thus transferring ink on the ink ribbon onto the recording paper 9 to record an image thereon. Incidentally, the recording paper 9 is supported, at its back surface, by a platen roller 38.

Next, the construction of each of the constructural elements will be fully explained. Incidentally, in this embodiment, the same elements as those in the first embodiment will be designated by the same reference numerals, and the explanation therefor may be referred to the first embodiment.

The ink ribbon 32 comprises a base film and a heat transferable (for example, heat fusible, thermoplastic, or heat sublimable) ink layer. Preferably, the ink includes resin, and more preferably includes ionomer resin. Incidentally, the ionomer resin comprises a main chain of hydrocarbon, and side chains of carboxyl group partially or wholly neutralized by metallic ion or fourth grade ammonium ion. In this embodiment, among such ionomer resins, an ionomer resin obtained by neutralizing copolymer comprising $\alpha$-olefin such as ethylene, propylene and the like and $\alpha,\beta$-unsaturated carboxylic acid with metallic ion is used. The content of the ionomer resin in the heat transferable ink is preferably 5–70%.

The ink ribbon 32 used in this embodiment has a width W of 8 mm, and comprises, as shown in FIG. 7, the base film 32*a*, an intermediate layer 32*b* laminated to the base film, a first transfer layer 32*c* laminated to the intermediate layer, and a second transfer layer 32*d* laminated to the first transfer layer, which layers constitute the heat transferable ink layer. More particularly, the ink ribbon 32 has the construction described in the Japanese Patent Application No. 62-146380 (filed on June 12, 1987); a polyester film having a thickness of 6 μm is used as the base film 32*a*, and the intermediate layer 32*b*, first transfer layer 32*c* and second transfer layer 32*d* are constituted by the following components, respectively:

| | |
|---|---|
| **Intermediate Layer (thickness = 1.0 μm)** | |
| Polyethylene oxide (number-average molecular weight 2000, oxidation 16, softening point 104° C.) | 80 parts |
| Surface-active agent | 15 parts |
| Amine | 5 parts |
| Ion-exchanged water | 405 parts |
| **First Transfer Layer (thickness = 2.2 μm)** | |
| Ethylene-vinyl acetate resin dispersion (M 16, ethylene content 80%) | 35 parts |
| Vinyl acetate-ethylene resin dispersion (ethylene content 20%) | 30 parts |
| Ethylene-methacrylate copolymer ionomer dispersion (ethylene content 90%, content ion: $Na^+$) | 20 parts |
| Carbon black dispersion (carbon black/dispersant = 20/3) | 25 parts |
| **Second Transfer Layer (thickness = 1.2 μm)** | |
| Ethylene-vinyl acetate resin dispersion (M 16, ethylene content 80%) | 40 parts |
| Ethyl methacrylate, styrene reforming ethylene-methacrylate copolymer ionomer dispersion (ethylene content in ethylene-methacrylate copolymer 90%, content ion: $Na^+$, styrene reforming rate 50%, ethylene methacrylate reforming rate 50%) | 30 parts |
| Vinyl acetate-ethylene resin dispersion (ethylene content 20%) | 30 parts |

The carriage 3 is connected to a belt 4C extending between pulleys 4*a* and 4*b*, so that, when a carriage motor 4*d* connected to the pulley 4*a* is energized, the carriage 3 is reciprocably shifted along the carriage shaft 5.

When the carriage 3 is shifted in the direction shown by an arrow A in FIG. 8B, the ink ribbon 32 is gradually fed out from a feeding reel 1*c*, by shifting the ink ribbon by means of the pair of conveying rollers 6 in a direction shown by an arrow B, and by shifting the recording head 37 while pressing the ink ribbon 32 and the recording paper 9 against a platen 38.

Further, within the carriage 3, a winding motor 3*a*, and a take-up shaft 3*c* connected to the winding motor through a friction clutch 3*b* are arranged in place in such a manner that, only when the recording is effected (i.e., only when the carriage 3 is shifted in the direction A), the take-up shaft 3*c* is rotated in a direction shown by an arrow C in synchronous with the movement of the carriage 3. The friction clutch 3*b* is so selected that, when a torque of a predetermined value or more is applied to the clutch, it does not transmit a rotational force of the motor 3*a* to the take-up shaft 3*c*. When the cassette 1 is mounted on the carriage 3, a take-up reel 1*d* of a cassette 1 is fitted onto the take-up shaft 3*c*, whereby the ink ribbon 32 is wound around the take-up reel 1*d* by the same amount as that fed out from the feeding reel 1*c*, by driving the motor 3*a*.

Further, the carriage 3 is provided at its front surface with an aperture 3*d* in a position corresponding to an aperture (not shown) of a lower case 1*a* of the cassette 1, and the recording head 37 is positioned in front of the aperture 3*d* for rocking movement in the directions shown by an arrow D.

The recording head 37 comprises a glazing layer (not shown) formed on a base plate 37*a*, and a plurality of heating elements 37*b* arranged in a row on the glazing layer and selectively energized in response to an image signal. The row of the heating elements 37*b* are arranged in the vicinity of a side edge of the base plate 37*a* at downstream side of the moving ink ribbon with respect to the recording head (accordingly, the recording head is a so-called "edge head"). With this construction, the ink ribbon 32 heated by the heating elements 37*b* can be peeled from the recording paper 9 for a short time in the order of a few micro seconds after heated, thus improving the separation of the ink.

It is preferable that a distance $\Delta x$ between the end of the outermost heating element 37*b* and the edge of the base plate 37*a* is set to have a value of 250 $\mu$m or less, and more preferably 150 $\mu$m or less.

In this embodiment, regarding the recording head 37, the glazing layer having a thickness of 44 $\mu$m was used, the row of heating elements had dot density of 240 dot/inch and a length of 4.65 mm, and the distance $\Delta x$ from the edge of the base plate to the heating element row was 122 $\mu$m. Further, a length that the recording head 37 presses against the platen 38 was 6 mm.

When the recording operation is effected, the recording head 37 is lowered (head-down) and is pressed against the ink ribbon 32 and recording paper 9 by means of pressing means 40 to press the platen 38 with a set pressure.

The platen 38 against which the recording head 37 presses comprises a flat plate which is constituted by hard rubber having hardness of 73 degrees in this embodiment. The platen hard rubber is backed up by a platen holder 38*a*.

As shown in FIGS. 6 to 8, the pressing means 40 comprises a bent head arm 40*a* rotatably supported by a shaft 40*b* at its bent portion. The head arm 40*a* has one end $40a_1$ supporting the recording head 37 thereon, and the other end $40a_2$ connected to one end of a tension spring 40*d*, the other end of which is connected to a pressing arm 40*c*.

The pressing arm 40*c* has one end rotatably mounted on the shaft 40*b*, and the other end abutted against an outer periphery of a polygonal cam 40*e* by means of a tension spring 40*f*.

Accordingly, when the cam 40*e* is rotated, the head-down or head-up of the recording head 37 is effected, and if the head-down is effected, the spring 40*d* is pulled, whereby the recording head 37 presses against the platen 38 with a predetermined pressure. In this case, it is preferable to set the head pressure to have a value in a range between 800 gf/cm and 3500 gf/cm, and more preferably, in a range between 1100 gf/cm and 2500 gf/cm, and most preferably, in a range between 1600 gf/cm and 2500 gf/cm.

Further, the ink ribbon 32 is so tensioned that the tension Tf on the ink ribbon at the downstream side from the recording head 37, i.e., at the take-up side with respect to the recording head (referred to as "forward tension" hereinafter) can be changed by the tensioning means 11. The tensioning means 11 comprises a tension arm 11*a* rotatably supported by a shaft 11*b* and having one end provided with a rotatable roller 11*c* rotatably supported thereon and the other end connected to a tension spring 11*d*. The ink ribbon 32 is guided rollers 12*a*–12*d* rotatably mounted on the lower case 1*a* and the rotatable roller 11*c* on the tension arm 11*a*, and passes through between the paired rollers 6 and then reaches the take-up reel 1*d*.

Accordingly, the ink ribbon 32 is pulled in an upward direction (FIGS. 8A and 8B) by the force of the tension spring 11*d*, thereby applying the forward tension Tf to the ink ribbon.

Further, a magnet 11*e* is fixed to the tension arm 11*a*, which magnet 11*e* cooperates with a hall element 11*f* fixed to the lower case 1*a* in confronting relation to the magnet. With this arrangement, a distance between the magnet 11*e* and the hall element 11*f*, and, accordingly the inclination of the tension arm 11*a* can be detected, whereby during the recording operation the position of the tension arm 11*a* is maintained to constant by controlling the rotational speed of the paired rollers 6 to apply the constant forward tension Tf to the ink ribbon 32, thus preventing a delay in separation of the ink ribbon 32 from the recording paper 9.

While a value of the forward tension Tf can be set freely in accordance with a force of the spring 11*d*, in this embodiment, the forward tension Tf is set to have a value in the order of 35 gf–300 gf. More particularly, when a peeling angle of the ink ribbon 32 with respect to the recording paper 9 is $\alpha$ (degree), a width of the ink ribbon 32 is W (cm), a maximum recording width is Y (cm), the forward tension Tf is set to have a value in the following range:

$$(20Y)/(1-\cos\alpha) < Tf < 350W$$

Further, while the peeling angle $\alpha$ can be changed freely by changing the position of the guide roller 12*b*, in this embodiment, the peeling angle $\alpha$ is set to have a value in the following range:

$$13° < \alpha < 40°$$

Next, a heat transfer recording method using the above-mentioned heat transfer recording apparatus will be explained.

The recording head 37 is lowered (head-down) and then is pressed against the platen 38 with the interposition of the ink ribbon 32 and recording paper 9 with a head pressure of 800 gf/cm–3500 gf/cm, and the carriage 3 is shifted in the direction A (FIG. 8B) and the ink ribbon 32 is fed out gradually in the direction B, thus performing the recording operation. In this case, the heat transferable ink is fused by the heat of the heating elements 37*b* heated in accordance with the image signal and is transferred to and adhered to the recording paper 9. Although this fusible ink has high viscosity because it includes the resin as the main component, since the head pressure is high such as 800 gf/cm –3500 gf/cm, fibers in the recording paper 9 are elastically deformed and the high viscous fusible ink becomes familiar with the deformed fibers, whereby the ink can adhere to the recording paper at a wider contacting area.

Accordingly, when the ink sheet 32 is peeled from the recording paper 9 by tearing the non-fused ink from the fused ink, the extension of the fused ink (such as extension of millet jelly) is minimized.

Further, since the peeling angle of the ink ribbon 32 with respect to the recording paper 9 is small such as 40° or less, the non-fused ink can be teared from the fused ink moderately to keep the degree of the extension of the fused ink constant, thereby improving the edge sharpness of the recorded image.

In general, if the peeling angle $\theta$ is too small, since the non-fused ink cannot be separated from the fused ink surely at the edge portion of the latter, the position of the separation will not be constant. Particularly, in case of the ink including the resin as the main component, if the position of the separation is delayed, since coagulation force of the fused ink is restored, even the ink adhered to the recording paper would be separated from the recording paper together with the non-fused ink, thus creating the break at edge of the recorded image.

Therefore, in order to prevent the creation of the break at edge of the recorded image, it is not sufficient only to apply the forward tension to the ink ribbon in the extent that the ink ribbon 32 can be separated rom the recording paper 9, but it is necessary to stabilize the position or condition of the separation. In this respect, according to the present embodiment, since the forward tension Tf is greater than 20Y/(1-cos $\alpha$), the non-fused ink can be separated from the fused ink before the coagulation force of the fused ink is restored, thus preventing the break from occurring at the edge of the recorded image.

However, if the forward tension Tf is too great, not only the ink ribbon 32 itself would be teared, but also the image would readily be deteriorated. The cause of such degradation deterioration of the image is considered that the ink ribbon 32 slips with respect to the recording paper 9 when the forward tension Tf is increased too much. That is to say, while it is necessary to adjust a tension Tb at an upstream side of the ink ribbon 32 with respect to the recording head 7 (referred to as "back tension" hereinafter) at an optimum value with respect to the forward tension, when the forward tension Tf is increased, if the back tension Tb is also increased correspondingly, the value of the tensions Tf, Tb will be remarkably larger than the friction force between the surface of the ink ribbon 32 and the surface of the recording paper 9, thus unstabilizing the relative movement between the ink ribbon and the recording paper. Further, in the recording potion, there are a static friction force between the ink surface of the ink ribbon 32 and the recording paper 9, and a dynamic friction force between the base film **32*a* of the ink ribbon 32 and the recording head 7**; however, it is very difficult to completely control such friction forces, because they change in accordance with the surrounding temperature and/or moisture, the kind of the recording paper, and/or the recording pattern.

In this respect, according to this embodiment, since the forward tension Tf is set to have the value smaller than 350W, the inconvenience such as the tearing of the ink ribbon and the deterioration of the image can be eliminated.

Next, the test data obtained from the test recording operations performed by using the aforementioned heat transfer recording apparatus and by changing the forward tension Tf and the peeling angle $\alpha$ of the ink ribbon 32 will be shown.

(1) As to the minimum forward tension

A bond paper (Beck smoothness 2.5 sec.) and a heat transferable paper (Beck smoothness 80 sec.) were used as the recording paper 9, and the recording was effected with the head pressure of 1167 g/cm (700 gf).

Figure 9:
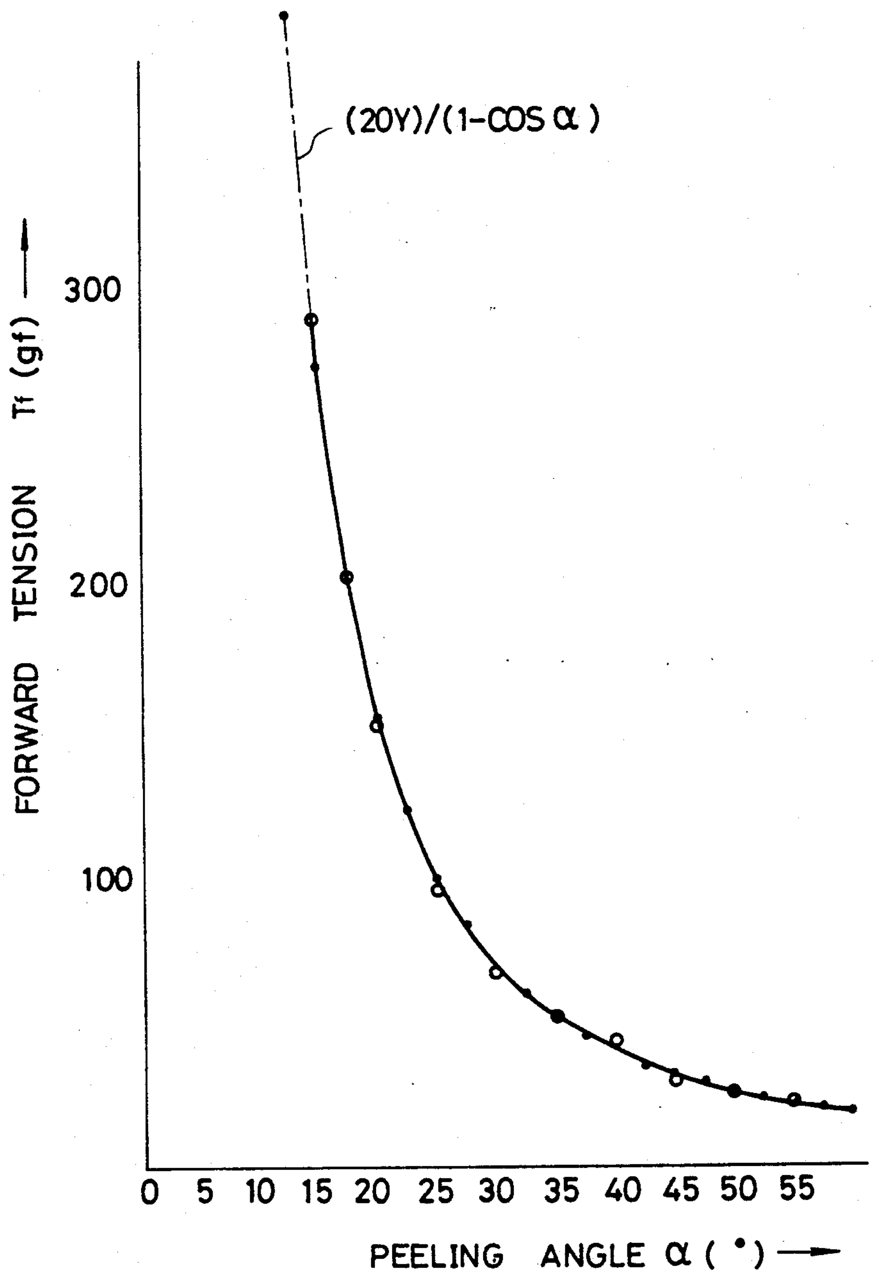
FIG. 9 is a graph showing a relation between a peeling angle and a minimum forward tension.

FIG. 9 shows a value of the minimum forward tension Tf necessary to prevent the occurrence of the break at the edge of the image. In this case, a longitudinal line having a length of 4.65 mm and a width of 210 μm was used as the recording pattern. It was found that the break at the image edge was most apt to be occurred, when the image (longitudinal line) having such maximum permissible width W was recorded.

In comparison with the bond paper and the heat transferable paper, the break at the image edge was readily occurred in case of the heat transferable paper than in case of the bond paper, but the values of the necessary forward tension Tf were substantially the same in both cases.

In the area or range of the forward tension above a solid line shown in FIG. 9, there was no occurrence of the break at the image, but in the range below the solid line it was ascertained that the break was occurred at the image.

Further, when the length of the longitudinal line as the recording pattern was about a half of the above value, i.e., 2.33 mm, in comparison with in case of the maximum permissible width W, the minimum forward tension Tf necessary to prevent the occurrence of the break at the image became about a half. Further, when the length of the above longitudinal line corresponded to the maximum permissible width W, i.e., 4.65 mm, the value of the forward tension necessary to cause the separation seemingly at the edge of the recording head 37 was about 70% of the value shown by the solid line in FIG. 9.

As apparent from the graph of FIG. 9, with respect to the relation between the maximum permissible width Y (0.465 cm) and the peeling angle $\alpha$, the solid line substantially coincides with a chain-dot line (Tf=20Y/(1−cos $\alpha$). Incidentally, when the forward tension Tf exceeds 300 gf, since the ink ribbon 32 was often teared, it was difficult to measure the forward tension.

(2) As to the peeling angle

Figure 10:
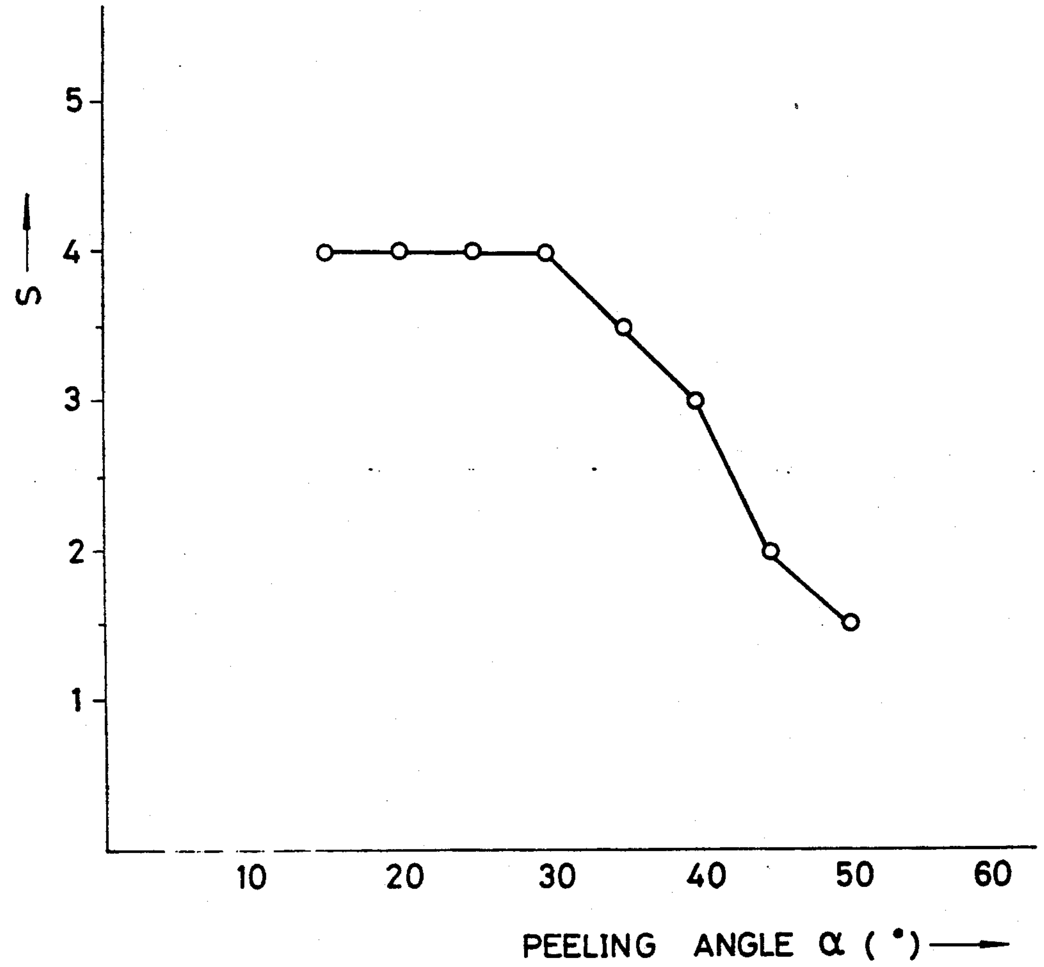
FIG. 10 is a graph showing a relation between a peeling angle and the degree of sharpness of an image edge.

FIG. 10 is a graph showing subjective appreciation regarding the sharpness S of the edge of the image obtained from the recording result performed by changing the peeling angle $\alpha$ while maintaining the forward tension Tf and back tension Tb constant.

In this test, the recording was effected, with the forward tension Tf of 280 gf, by changing the back tension Tb within the range below 200 gf. It was found that the optimum image was obtained when the back tension Tb was 150 gf (forward tension =280 gf).

When the above-mentioned bond paper was used as the recording paper 9, as shown in the graph, it was found that the sharpness S of the image edge was suddenly worsened when the peeling angle $\alpha$ exceeded 40°.

Incidentally, when the above-mentioned heat transferable paper was used as the recording paper 9, it was found that the sharpness S of the image edge was not substantially different at any peeling angle $\alpha$, except that when the peeling angle $\alpha$ exceeded 50° the sharpness S was slightly worsened.

(3) As to the maximum forward tension

Figure 11:
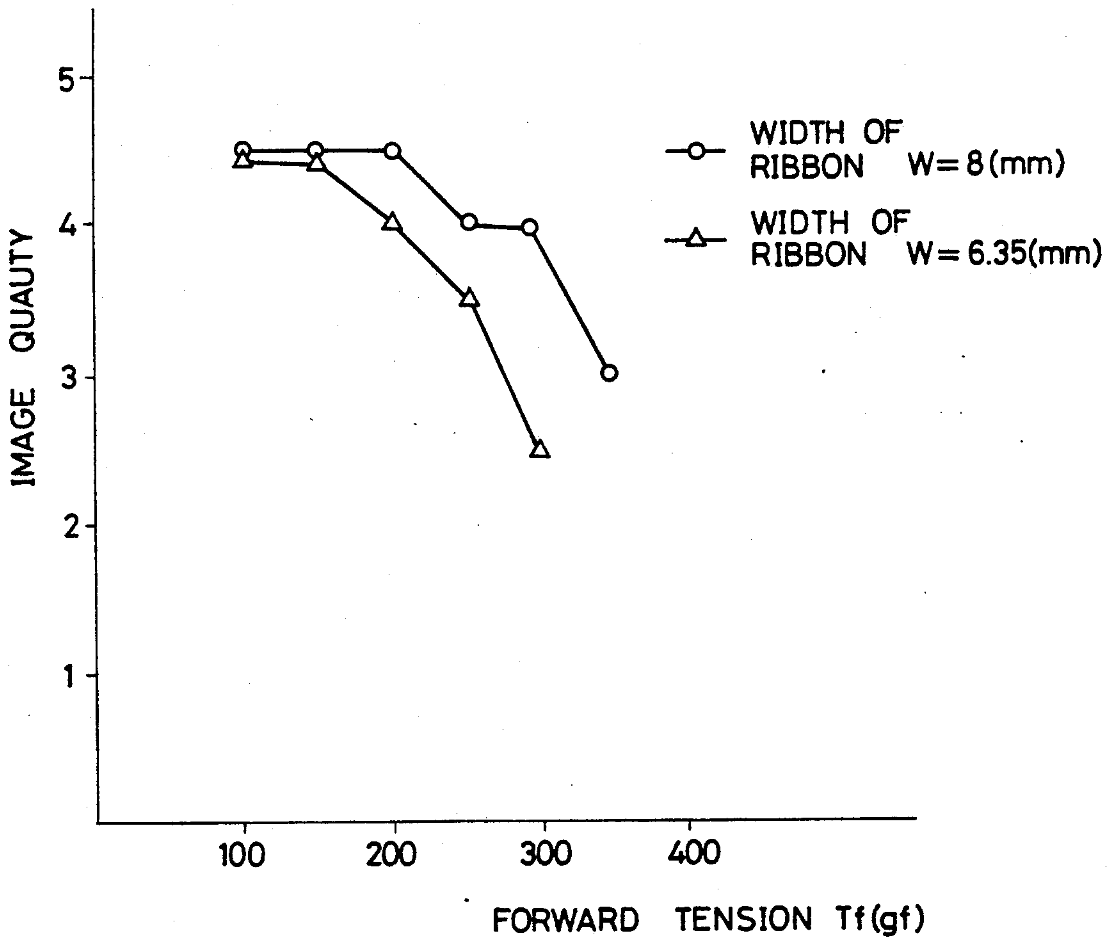
FIG. 11 is a graph showing a relation between the forward tension and image quality.

FIG. 11 is a graph showing subjective appreciation regarding the image quality obtained from the recording result performed with respect to the above-mentioned bond paper and heat transferable paper, by changing the forward tension Tf while maintaining the peeling angle $\alpha$constant (=30°).

Incidentally, the back tension Tb was set to a value that when the forward tension was changed the optimum image was obtained for the changed forward tension.

First of all, when the ink ribbon having a width of 8 mm was used, it was found that the narrower lines in the image were blotted when the forward tension exceeded 300 gf, thus worsening the image quality and increasing the dispersion of the image quality. Further, when the forward tension exceeded 300 gf, it was ascertained that the ink ribbon 32 was often teared.

Next, when the ink ribbon having a width of 6.35 mm was used, it was found that the image was deteriorated and the ink ribbon 32 was often teared, when the forward tension exceeded 250 gf.

From the result mentioned above, it was found that it was preferable that the forward tension Tf was set to have the value of 350W or less regarding the width W (cm) of the ink ribbon.

(4)Total appreciation

Figure 12:
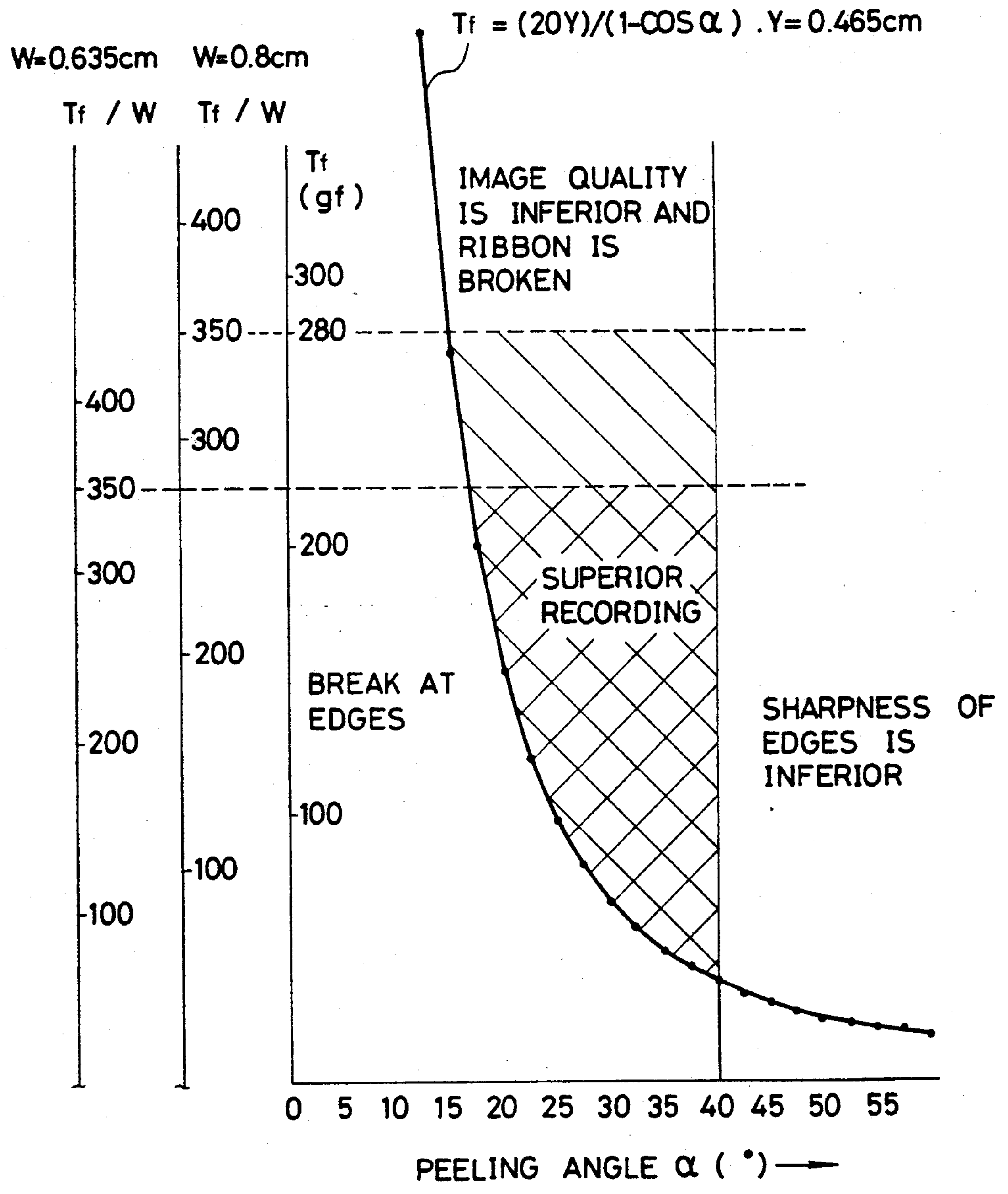
FIG. 12 a graph showing total valuation appraisal of a transferred image.

Arranging the results of the above tests (1)-(3), FIG. 12 is obtained.

In FIG. 12, the hatched area shows an area which can obtain good image quality. From this, it will be found that the good image quality can be obtained when the peeling angle $\alpha$ and the forward tension Tf are set to values as mentioned above.

If the forward tension Tf is set to have a value in a range narrower than the above range, for example, $(30Y)/(1-\cos\alpha)<Tf<300W$, latitude be allowed with respect to the vibration of the apparatus and the like, thus providing the image of high quality.

As mentioned above, according to this embodiment, by performing the recording operation with the condition that the peeling angle and the forward tension are set in a predetermined range, respectively, it is possible to obtain the good transferred image even as to the smoothless recording paper.

Incidentally, in the aforementioned example, while the recording with the head pressure of 1167 gf/cm (700 gf) was explained, it was found that if the head pressure was set to a higher value, for example, 1600 gf/cm, the similar effect could be obtained.

Further, conversely, if the head pressure was set to a lower value, for example, about 583 gf/cm (350 gf), while the image quality was slightly worsened as a whole, as shown by the hatched area in FIG. 12, the good image could be obtained in comparison with the other areas.

In addition, when the head pressure was set to a value of 800 gf or more, the good image could be obtained in the hatched area of FIG. 12.

Furthermore, while it is preferable to use the ink including the resin as the main component for the heat transferable ink, the resin component of the ink is not limited to the above-mentioned ones, but other resin such as acrylic resin, low-molecular weight polyester resin, urethane resin, styrene-acrylic resin, polyamide resin and the like can be used.

Incidentally, in the above-mentioned embodiment, while an example of the recording head having a plurality of heating elements was explained, the present invention is not limited to this example, but, a supply heating head which can be electrically connected to electrodes embedded in the ribbon may be used as the recording head. As a heating method, a laser heating method, supply heating method and the like may be used.

As mentioned above, according to this embodiment, since the recording is effected with the condition that the peeling angle of the ink ribbon with respect to the recording paper and the forward tension are set values in the predetermined ranges, it is possible to obtain the recorded image having the good sharpness of the edge thereof even as to the smoothless recording paper, as well as the smooth-faced recording paper.

As mentioned above, the heat transfer recording method and apparatus according to the present invention can provide a recorded image of high quality.

What is claimed is:

1. A heat transfer recording method for recording an image on a recording medium by selectively applying thermal energy to a transfer recording medium with a recording head, said transfer recording medium having a downstream side with respect to said recording head, comprising:

providing an ink ribbon cassette carrying said transfer recording medium;

providing tension means for controlling a tension applied to said downstream side of said transfer recording medium;

varying a pressing force of said recording head; and correspondingly varying said tension applied to said downstream side of said transfer recording medium in response to said varying of said pressing force.

2. A heat transfer recording method as in claim 1 wherein said pressing force is varied to have one of a plurality of pressing force values, and said tension is varied according to a predetermined scheme to have a different tension value for each one of said plurality of pressing force values.

3. A heat transfer recording method for recording an image on a recording medium by selectively applying thermal energy to a transfer recording medium with a recording head, said transfer recording medium having a downstream side with respect to said recording head, comprising:

providing a conveyance route for said recording medium;

providing a carrier which can be reciprocally moved along said conveyance route;

providing control means for controlling a pressing force of said recording head on said carrier;

varying said pressing force; and, correspondingly varying said tension applied to said downstream side of said transfer recording medium in response to said varying of said pressing force.

4. A heat transfer recording method as in claim 3 wherein said pressing force is varied to have one of a plurality of pressing force values, and said tension is varied according to a predetermined scheme to have a different tension value for each one of said plurality of pressing force values.

5. A heat transfer recording method for recording an image on a recording medium by selectively applying thermal energy to a transfer recording medium with a recording head, said transfer recording medium having a downstream side with respect to said recording head, comprising:

varying a pressing force of said recording head;

correspondingly varying a tension on said downstream side of said transfer recording medium in response to said varying of said pressing force; and providing control means for controlling said tension, said control means for controlling having a setting table of values, said table of values having a plurality of different pressing force values for said recording head and a plurality of corresponding tension values, said control means for controlling varying said tension in accordance with said table based upon said pressing force.

* * * * *

UNITED STATES PATENT AND TRADEMARK OFFICE
CERTIFICATE OF CORRECTION

PATENT NO. : 5,072,238

DATED : December 10, 1991

INVENTOR(S) : MAKOTO TAKAMIYA ET AL.

It is certified that error appears in the above-identified patent and that said Letters Patent is hereby corrected as shown below:

COLUMN 1

Lines 40-41, "(smooth-less)" should read --(non-smooth)--.
Line 42, "dignity." should read --resolution.--.
Line 44, "dignity," should read --resolution,--.
Line 56, "dignity" should read --resolution--.
Line 58, "dignity" should read --resolution--.
Line 61, "smoothless" should read --non-smooth--.
Line 63, "smoothless" should read --non-smooth--.
Line 66, "smoothless" should read --non-smooth--.

COLUMN 2

Line 6, "dignity" should read --resolution--.
Line 12, "dignity." should read --resolution.--.
Line 16, "smoothless" should read --non-smooth--.
Line 28, "dignity," should read --resolution,--.

COLUMN 3

Line 30, "in partially broken." should read --in partially broken view.--.
Line 48, "that" should read --with which--.

COLUMN 4

Line 15, "synchronous" should read --synchronism--.

COLUMN 6

Line 3, "force" should read --forces--.
Line 55, "synchronous" should read --synchronism--.
Line 66, "where" should be deleted.

UNITED STATES PATENT AND TRADEMARK OFFICE

CERTIFICATE OF CORRECTION

PATENT NO. : 5,072,238

DATED : December 10, 1991

INVENTOR(S) : MAKOTO TAKAMIYA ET AL.

It is certified that error appears in the above-identified patent and that said Letters Patent is hereby corrected as shown below:

COLUMN 7

Line 9, "where" should be deleted.
Line 27, "smoothless" should read --non-smooth--.
Line 29, "smoothless" should read --non-smooth--.
Line 64, "passed" should read --passing--.

COLUMN 9

Line 1, "be slipped" should read --be shifted--.
Line 56, "constructural" should be deleted.

COLUMN 10

Line 68, "synchronous" should read --synchronism--.

COLUMN 11

Line 20, "are" should read --is--.

COLUMN 12

Line 28, "to" should be deleted.

COLUMN 13

Line 11, "teared" should read --sheared--.
Line 28, "rom" should read --from--.
Line 39, "teared," should read --torn,--.
Line 55, "potion, there are" should read --portion, there is--.

UNITED STATES PATENT AND TRADEMARK OFFICE
CERTIFICATE OF CORRECTION

PATENT NO. : 5,072,238

DATED : December 10, 1991

INVENTOR(S) : MAKOTO TAKAMIYA ET AL.

It is certified that error appears in the above-identified patent and that said Letters Patent is hereby corrected as shown below:

COLUMN 14

Line 7, "(Beck" should read --(Bekk--.
Line 8, "(Beck" should read --(Bekk--.
Line 16, "be" should be deleted.
Line 17, "curred," should read --cur,--.
Line 20, "was" should be deleted.
Line 29, "was" should be deleted.
Line 48, "teared," should read --torn,--.

COLUMN 15

Line 20, "teared." should read --torn.--.
Line 23, "teared," should read --torn,--.
Line 39, "be allowed" should read --will be allowed--.
Line 47, "smoothless" should read --non-smooth--.

COLUMN 16

Line 16, "smoothless" should read --non-smooth--.

Signed and Sealed this

Twelfth Day of October, 1993

Attest:

BRUCE LEHMAN

*Attesting Officer* *Commissioner of Patents and Trademarks*